United States Patent [19]

Angelillo

[11] 3,972,696
[45] Aug. 3, 1976

[54] FLUE GAS POLLUTION ELIMINATOR

[76] Inventor: Olindo R. Angelillo, 1550 Glen Aylsa Ave., Los Angeles, Calif. 90041

[22] Filed: July 24, 1975

[21] Appl. No.: 598,748

[52] U.S. Cl. .................................. 55/222; 55/244; 55/257 HE; 110/119; 261/DIG. 9; 261/152
[51] Int. Cl.² ........................................ B01D 47/02
[58] Field of Search ....... 55/222, 261, 264, 257 HE; 261/DIG. 9, 77, 119 R, 152, 153; 110/119, 184; 23/277 C

[56] References Cited
UNITED STATES PATENTS

| | | | |
|---|---|---|---|
| 2,630,880 | 3/1953 | Schmieg | 55/261 |
| 3,055,417 | 9/1962 | Reed | 98/60 |
| 3,442,232 | 5/1969 | White | 261/DIG. 9 |
| 3,702,756 | 11/1972 | Bowman | 261/DIG. 9 |
| 3,833,205 | 9/1974 | McAnespie | 261/153 |
| 3,893,829 | 7/1975 | Valentino | 55/259 |

*Primary Examiner*—Bernard Nozick
*Attorney, Agent, or Firm*—Dominick Nardelli

[57] ABSTRACT

This pollution eliminator is comprised of three concentric vertical stacks or chimneys, wherein the outer stack is higher than the inner stack. Exhaust flue gases primarily from a furnace is directed up through the central stack, wherein the hot flue gases rise, as in a conventional chimney. The flue gases, on exiting the central stack, expand laterally wherein the fly ash is captured by the intermediate stack and drops down the annular space formed therebetween. The flue gases, on exiting this intermediate stack, further expand within the outer stack. Means are provided in the annular space between the outer and intermediate stack to cause water vapor to rise therein. The vapor reacts with some of the oxides of the gases from the flue to form acid molecules which are condensed on the upper inner wall of the outer stack. Means are provided, also in the outer stack, to cause the flue gases to spin, to enhance the capture of acid molecules on the wall thereof. To further enhance mixing of the flue gases with the water vapor, the intermediate stack has openings or apertures in its wall, primarily in the region above the center stack to allow water vapor to enter this stack.

9 Claims, 5 Drawing Figures

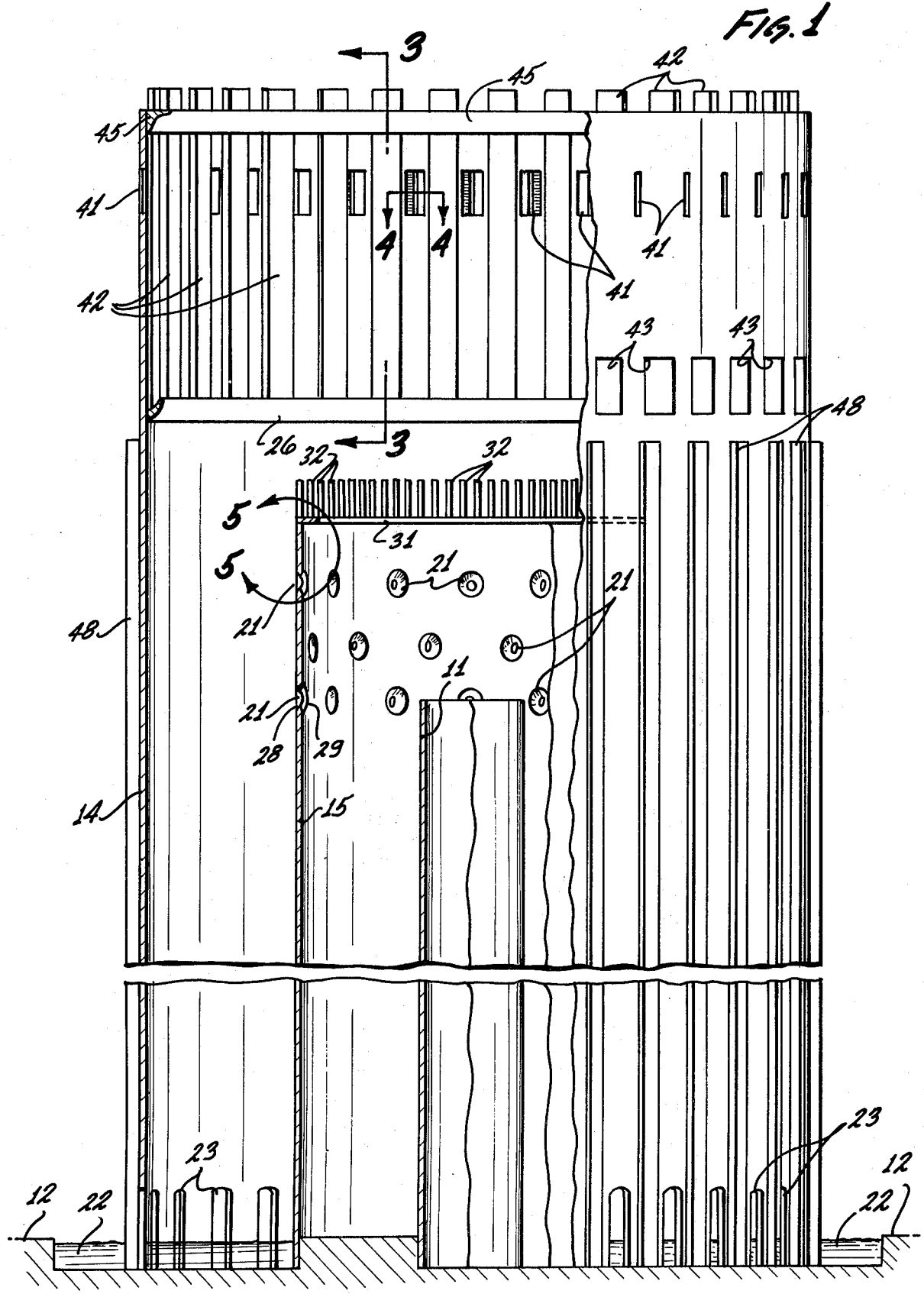

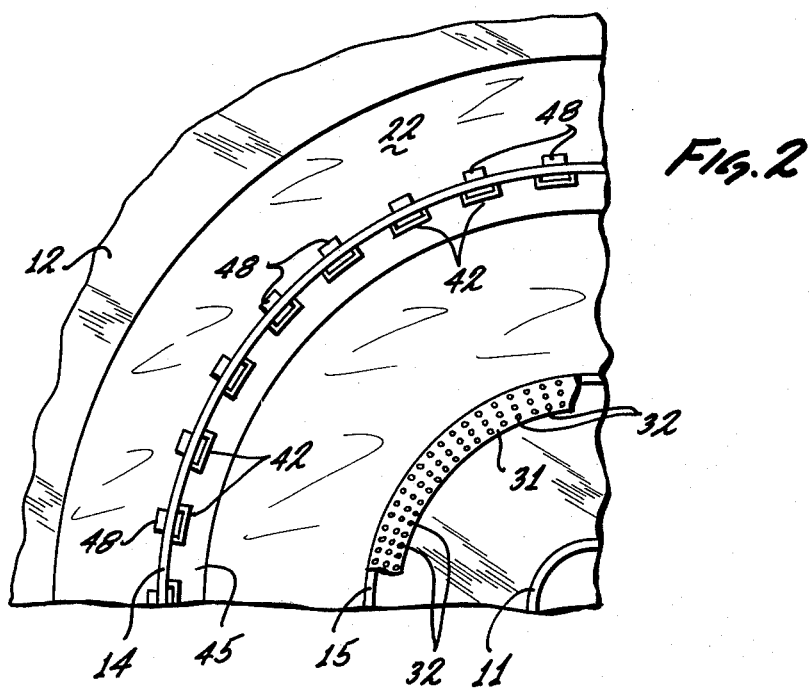
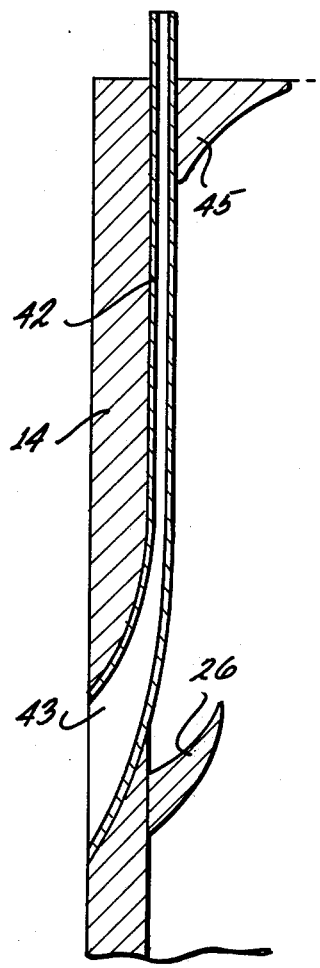
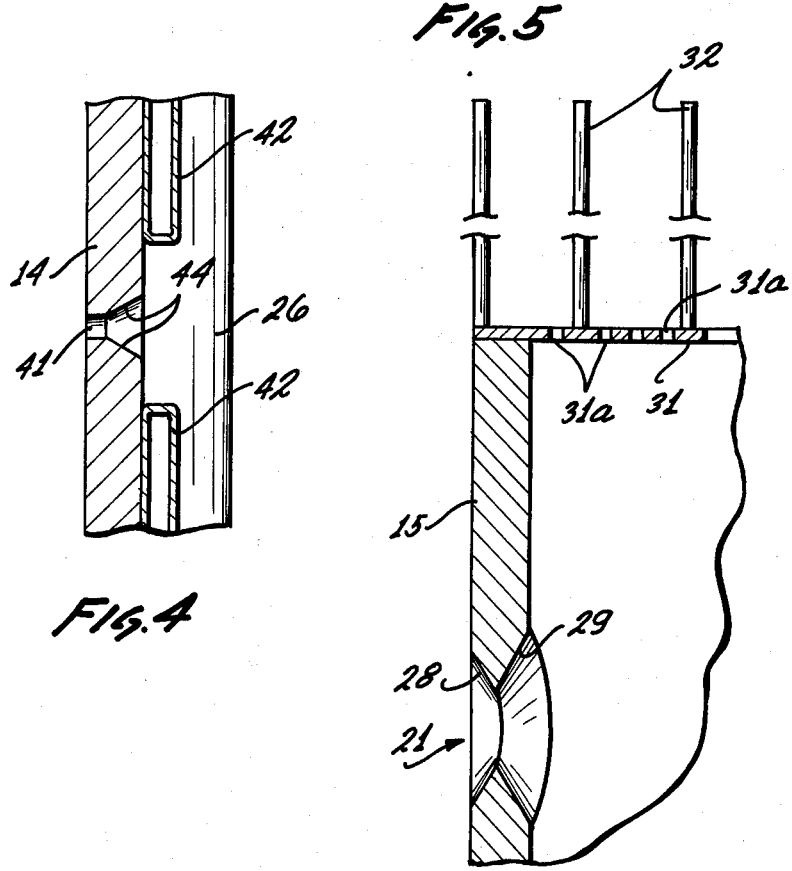

FLUE GAS POLLUTION ELIMINATOR

FIELD OF THE INVENTION

This invention relates to an apparatus or device for removing air pollutant contaminants from flue gases and, more specifically, for removing solids and noxious oxides therefrom.

BACKGROUND OF THE INVENTION

Up to now, sulphur containing fuels have been prohibited from use as energy sources because, as everyone knows, when sulphur burns, oxides of sulphur are formed which, when combined with water, form acids of sulphur. However, even non-sulphur fuels, when burned, inherently form oxides of nitrogen, which can also be dangerous to health, if in sufficient concentration. The production of nitrogen oxide cannot be prevented because of the high burning temperatures as the production of nitrogen oxides rises with the combustion temperature. These oxides, when in the atmosphere, often combine with water in the vapor state to form nitric acids. In addition, when coal is used as a fuel, relatively large quantities of metal oxides are formed because coal contains traces of many metals. These metal oxides, being solids, are termed fly ash. The main objection to fly ash is that it dirties everything it settles upon and it does get into one's lungs.

Fly ash can be successfully removed by filtering flue gases through what is commonly termed "bag houses." However, the objectionable noxious oxides, being in the gas state, cannot be readily filtered. The prior art teaches spraying the flue gases directly with water to cause the objectionable gases to become dissolved therein and be washed away. This process is costly because, for one thing, the flue gases are cooled to the point that the remaining flue gases, primarily carbon dioxide, cannot rise into the atmosphere to form a draft to promote combustion. In addition, besides needing energy to provide a draft, energy is required to form the water sprays, which energy cannot be recovered.

OBJECTS OF THE INVENTION

An object of this invention is to provide an apparatus that efficiently and economically removes fly ash and noxious oxides from the flue gases.

Another object is to cause the removal of fly ash and noxious oxides by utilizing the earth's gravitational and wind forces.

Another object is to provide a semi-closed, elevated chamber wherein relatively high velocity flue gases are emptied into so that fly ash and noxious oxides are captured and allowing only the carbon oxides to leave therefrom.

These and other objects and features of advantage will become more apparent after studying the following description of the preferred embodiment of my invention, together with the appended drawings.

BRIEF DESCRIPTION OF THE DRAWINGS

FIG. 1 is an elevation of my novel apparatus, shown in partial section.

FIG. 2 is a plan view showing one quadrant of the apparatus, the other quadrants being similar.

FIG. 3 is a sectional view taken on line 3—3 in FIG. 1.

FIG. 4 is a sectional view taken on line 4—4 in FIG. 1.

FIG. 5 is an enlarged sectional view of the portion enclosed by circles 5—5 in FIG. 1.

DETAILED DESCRIPTION OF THE DRAWINGS

Briefly, the invention consists of a standard chimney which allows hot exhaust or flue gases to rise and be dispensed at some elevated position above ground. In my invention, I have provided a chamber at the elevated position and the chamber is provided with means for separating and extracting from the carbon dioxide the fly ash, and also the noxious acid-base oxides, which form a stable acid when they chemically combine with a water molecule. The carbon dioxide is exhausted from the top of the chamber.

Referring to FIG. 1, item 11 represents a standard chimney which, in the preferred embodiment, is, for example, 500 feet high and 80 feet in diameter. Item 12 represents ground level. The above mentioned chamber is formed by an outer chimney 14, concentric with chimney 11, and outer chimney 14 is, for example 1000 feet high and 575 feet in diameter, for reasons that will become apparent hereinafter. Between the chimney 11 and the outer chimney or structure 14 is an intermediate chimney 15 which is, for example, 650 feet high and 300 feet in diameter, whose function is, as will be explained, to capture the major portion of the fly ash. The remaining details of my novel structure will be explained in conjunction with the operations thereof.

By standard means, not shown, hot flue gases are introduced into the bottom of chimney 11 and the gases rise therein. At the time they leave the center chimney 14, the temperature of the flue gases should be approximately 375° F and have a velocity of 80 feet per second. The flue gases in the natural twisting plume now enter intermediate chimney 15 and inherently they drop in temperature and velocity. This causes the larger fly ash particles to fall down into the space between the center and intermediate chimneys 11 and 15. Some of the smaller fly ash will strike the upper inner wall of chimney 15 and then drop. The upper wall of chimney 15 has a plurality of apertures 21, shaped as shown in FIG. 5 for reasons that will be explained hereinafter. The still smaller particles of fly ash and the gaseous molecules of oxides exit from this intermediate chimney and enter the outer chimney 14. The flue gases again slow down. The outer chimney 14 is situated over an annular shaped water pond 22, as shown, so that the water extends from outside of chimney 14 to the outer surface of chimney 15. This water preferably should be heated to enhance vaporation and therefore the discharge from the condenser's cooling water may be discharged herein. The outer chimney 14 has a plurality of archways 23 formed in the wall thereof at ground level. These archways 23 are higher than the height of the water on the pond. This allows adequate atmospheric air to enter into the archways 23, thereby becoming saturated with water vapor and then rise up the annular space between chimneys 14 and 15. The saturated air intermixes with the flue gases that leave the intermediate chimney 15 so that by the time these gases rise to the top of the outer chimney 14, the noxious oxides and water chemically combine to form various acids that are normally liquid. Since the molecular weight of these gases or acids is heavier than the carbon dioxide, and the acid molecules diverge toward the upper inner wall of chimney 14 where the molecules condense and flow down the wall to be caught in an annular gutter 26. The gutter 26 extends around the inner wall of chimney 14 and has a drain (not shown) to drain off the acids.

Although the above physical and chemical reactions occur without any external help, i.e., by not adding energy, various means have been included in the structure to shift the point of equilibrium so that more of the noxious oxide molecules are converted to acid molecules and become captured before the flue gases exit the outer chimney 14. In the intermediate chimney 14 the beforementioned apertures 21 allow the moist saturated air outside the chimney 15 to enter therein so that the water vapor and flue gases come in contact at an earlier time than in the system without the apertures 21. The natural twisting plume inherently increases the rate of impact between the gas molecules and fly ash to speed up chemical interaction between water molecules and the noxious acid-base molecules. As more clearly shown in FIG. 5, apertures 21 are made with opposing conical surfaces 28 and 29 to allow the saturated moist air to pass therethrough at a greater velocity than in the system wherein the apertures have a cylindrical wall. The higher velocity, besides causing more moisture to enter, improves the deflection of the fly ash from the opening. In addition, the top of chimney 15 is capped with an annular metallic ring 31. The ring 31 is preferably made of cast iron and, being metallic, it can be electrically charged. By charging the ring 31 negative (by well known means, not shown), one would find that a greater portion of the fly ash is trapped within chimney 15. However, under most natural conditions, ring 31 will be charged negative by the atmosphere. This ring 15 is provided with holes 31a, for example, one inch in diameter on 3 inch centers to further increase the capture of fly ash. In addition, metallic rods 32 are placed extending up from ring 31. These rods also capture the fly ash. These rods could be, for example, one inch metallic tubing, about 5 feet long. One finds that the fly ash that accumulates under the ring 31 could be cleaned by reverse charging the ring.

Fly ash contains oxides of iron, copper, vanadium, which could act as catalytic agents to speed the reaction to convert the noxious oxides of sulphur and the water to form acids of sulphur, and also to convert the noxious oxides of nitrogen and water to form acids of nitrogen. Thus, by allowing the moist air to enter the intermediate chimney 15 through apertures 21, the reaction time is increased. These molecules of acid and carbon dioxide, on exiting the intermediate chimney 15, come in contact with more water vapors. To further increase the reaction time, the outer chimney 14 is provided with whistler slots 41 at the top thereof, as shown in FIGS. 1 and 4. These slots are spaced evenly around the chimney and they allow wind currents to enter the chimney, which naturally causes the flue gases to spiral in response thereto, in a well known physical phenomenon. This causes the heavy acid molecules to spin out against the wall of the chimney. To aid in the condensation of the acids, the inner wall is provided with a plurality of tubular condensers 42, extending axially parallel thereto, and disposed interstitially with the slots 41. The condensers 42 are made of, for example, plastic, and have their lower ends 43 made flush with the exterior wall of chimney 14, as shown in FIG. 3. These tubes 42 extend upward along the inner wall. The cool winds enter openings 43 and are forced up the condensers 42 and out the top. Thus, the temperature of the walls of the condensers is further decreased to enhance condensation.

The structure could include additional features to insure proper operation during periods of temperature inversion. One such feature is an inversion protection flange 45 extending inward from the periphery of the outer chimney 14. This flange extends inward, for example, 15 feet, and has a concave underside. This inversion protective flange should serve to modify the "lee" downdraft inside the chimney 14 during still air periods and periods of heavy air. The outer chimney 14 is preferably made with support pilasters 48 extending outward, as shown. Besides increasing the strength of the structure, these pilasters 48 aid the downdrafts on the outside of the chimney 14 to cause more air to sweep through the archways 23 to draw up more moisture. If required, water spargers or sprinklers, not shown, could be added in the annular space between chimneys 14 and 15 to insure the production of the saturated air.

Safety features also would be incorporated into the system. For example, air jets (not shown), can be placed around the periphery of the intermediate chimney 15 to direct blasts of air down the annular space between chimneys 11 and 15 to flush out explosive mixtures, as required. Monitors (not shown), strategically located, would indicated when purging was required. Water spargers or sprinklers may also be placed within this annular space to wet down the fly ash that collect on the bottom and may be continuously removed by standard means (not shown). In addition, lightning rods (not shown) can be placed around the top of each outer chimney and grounded through the pilasters 48 which would preferably be made of steel.

Having described the preferred embodiment of my invention, one skilled in the art can devise other embodiments without departing from the spirit and scope of my invention. Therefore, my invention is not to be considered limited to the embodiment shown, but includes all embodiments falling within the scope of the appended claims.

I claim:

1. A device for cleaning pollutants from flue gases, said device comprising:
   a first chimney for receiving said flue gases for imparting an upward velocity thereto, and for exiting said flue gases from the top of said first chimney;
   a second chimney disposed surrounding said first chimney and having a height that is substantially higher than and having a diameter that is substantially bigger than said first chimney so that the gases from said first chimney discharge into said second chimney and become decelerated;
   said second chimney being opened at its lower end to the atmosphere;
   first means disposed for introducing a water vapor within the annular space formed between said first chimney and said second chimney at a region below the top of said first chimney so that said vapors rise with the atmospheric air to mix with the rising flue gases after the gases are discharged from said first chimney, so that selective ones of said pollutants chemically combine with the water to form an acid; and
   heat exchange means for cooling the upper wall of said second chimney so that said acid may condense thereon.

2. The device of claim 1 wherein:

said first means comprises an annular water pond disposed exteriorly of said first chimney, having a water surface below the top opening thereof;

said second chimney extends down to said water pond and wherein the opening at the lower end are openings disposed above and adjacent to the surface of said water pond to allow ambient air to enter and rise with the water vapor escaping from the pond.

3. The device of claim 2 wherein said second means further comprises:

a plurality of tubular condensers disposed on the interior of said second chimney, and in the region thereof that is above said first chimney;

each of said condensers having one open end lower than the other open end, and said lower end communicating with the exterior of said second chimney so that winds can enter said condensers; and a gutter is provided on the inside of said second chimney below said tubes to collect any condensation.

4. The device of claim 3 wherein:

said condensers are disposed vertically with a space between two adjacent tubes;

said higher open end of said respective condenser extends at least to the top of said second chimney;

said second chimney has a vertically disposed slit formed between two adjacent condensers so that wind currents enter said slits to provide a swirling effect.

5. The device of claim 4 wherein:

a third chimney is disposed concentric between said first and second chimney, and is higher than said first chimney and lower than said second chimney;

said water pond is limited to being disposed outside of said third chimney and extends to the outside of said second chimney;

said second chimney having a plurality of archways disposed around its lower end, so that the water in said pond flows through the archways;

said archways have a height that extends above the water level in said pond so that air currents also flow therethrough.

6. The device of claim 5 wherein said third chimney has:

a plurality of apertures formed therethrough in the upper portion thereof;

a metallic annular flange disposed on top of said third chimney and extending inward therearound; and a plurality of vertically disposed metallic rods extending upward from said flange.

7. The device of claim 6 wherein said apertures are formed with opposing conical surfaces to minimize the resistance of any air currents passing therethrough;

said slits are formed with sloping sides to minimize resistance to any air currents passing therethrough.

8. The device of claim 7 wherein said second chimney has an inward extending flange.

9. The device of claim 8 wherein a plurality of pilasters are provided around said second chimney and protrude exteriorially therefrom to increase the probability of downward drafts outside said second chimney, thereby increasing the upward drafts of moist air within said second chimney.

* * * * *